United States Patent

Guo

(10) Patent No.: US 12,414,110 B2
(45) Date of Patent: Sep. 9, 2025

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 414 days.

(21) Appl. No.: 17/945,272

(22) Filed: Sep. 15, 2022

(65) Prior Publication Data

US 2023/0019570 A1    Jan. 19, 2023

Related U.S. Application Data

(63) Continuation of application No. PCT/CN2021/081111, filed on Mar. 16, 2021.

(60) Provisional application No. 63/000,877, filed on Mar. 27, 2020.

(51) Int. Cl.
H04W 72/1268    (2023.01)
H04L 1/08        (2006.01)
H04W 72/23      (2023.01)

(52) U.S. Cl.
CPC .......... H04W 72/1268 (2013.01); H04L 1/08 (2013.01); H04W 72/23 (2023.01)

(58) Field of Classification Search
CPC .... H04W 72/1268; H04W 72/23; H04L 1/08; H04L 5/0051; H04L 5/0094; H04L 5/0044
See application file for complete search history.

(56) References Cited

U.S. PATENT DOCUMENTS

| | | | |
|---|---|---|---|
| 2019/0313342 A1 | 10/2019 | Papasakellariou | |
| 2020/0052827 A1* | 2/2020 | Vilaipornsawai | H04W 72/23 |
| 2023/0025005 A1* | 1/2023 | Guo | H04W 72/23 |
| 2023/0076139 A1* | 3/2023 | Muruganathan | H04L 5/0048 |

FOREIGN PATENT DOCUMENTS

| | | |
|---|---|---|
| CN | 110913488 A | 3/2020 |
| EP | 3809602 A1 | 4/2021 |
| WO | 2019244207 A1 | 12/2019 |

(Continued)

OTHER PUBLICATIONS

Muruganathan et al.—U.S. Appl. No. 62/976,098, filed Feb. 13, 2020; provisional for U.S. Patent Publication 2023/0076139 (Year: 2020).*

(Continued)

*Primary Examiner* — Nicholas R Taylor
*Assistant Examiner* — Angela Widhalm De Rodriguez
(74) *Attorney, Agent, or Firm* — BAYES PLLC

(57) ABSTRACT

An apparatus and a method of wireless communication are provided. The method by a user equipment (UE) includes being scheduled with a physical uplink shared channel (PUSCH) with one or more repetition transmissions and being indicated with transmission configurations for the PUSCH with one or more repetition transmissions. This can solve issues in the prior art, utilize multi-transmission/reception point (TRP) reception, improve uplink reliability, provide a good communication performance, and/or provide high reliability.

20 Claims, 2 Drawing Sheets

(56) References Cited

FOREIGN PATENT DOCUMENTS

WO          2020033785 A1     2/2020
WO          2021197053 A1     10/2021

OTHER PUBLICATIONS

The supplementary European search report dated Jul. 27, 2023 from European patent application No. 21774960.5.
NTT Docomo et al, "Configured grant enhancement for NR-U", 3GPP Draft; R1-2000913, 3rd Generation Partnership Project (3GPP), Mobile Competence Centre ; 650, Route Des Lucioles ; F-06921 Sophia-Antipolis Cedex ; France, vol. RAN WG1, No. e-Meeting; Feb. 24, 2020-Mar. 6, 2020, Feb. 14, 2020 (Feb. 14, 2020).
NTT Docomo et al, "Summary on URLLC enhanced configured grant transmission", 3GPP Draft; R1-1912890, 3rd Generation Partnership Project (3GPP), Mobile Competence Centre ; 650, Route Des Lucioles ; F-06921 Sophia-Antipolis Cedex ; France, vol. RAN WG1, No. Reno, US; Nov. 18, 2019-Nov. 22, 2019, Nov. 19, 2019 (Nov. 19, 2019).
The Examination Report dated May 15, 2024 from European patent application No. 21774960.5.
VIVO, "PUSCH enhancements for URLLC", 3GPP TSG RAN WG1 #96bis, R1-1904083, Apr. 12, 2019 (Apr. 12, 2019), sections 1-2.
OPPO, "PUSCH enhancement for URLLC", 3GPP TSG RAN WG1 #96bis, R1-1904044, Apr. 12, 2019 (Apr. 12, 2019), sections 1-2.
Sharp, "Discussion on multi-TRP/panel techniques for URLLC", 3GPP TSG RAN WG1 Meeting #97, R1-1907228, May 17, 2019 (May 17, 2019), sections 1-2.
Qualcomm Incorporated, "PUSCH Enhancements for eURLLC", 3GPP TSG-RAN WG1 #97, R1-1907283, May 17, 2019 (May 17, 2019), sections 1-2.
International Search Report and the Written Opinion dated Jun. 16, 2021 from the International Searching Authority Re. Application No. PCT/CN2021/081111.

\* cited by examiner

APPARATUS AND METHOD OF WIRELESS COMMUNICATION

CROSS-REFERENCE TO RELATED APPLICATIONS

This application is a continuation of International Application No. PCT/CN2021/081111, filed on Mar. 16, 2021, entitled "APPARATUS AND METHOD OF WIRELESS COMMUNICATION", which claims the benefit of priority to U.S. Provisional Application No. 63/000,877, filed on Mar. 27, 2020, both of which are incorporated herein by reference in their entireties.

TECHNICAL FIELD

The present disclosure relates to the field of communication systems, and more particularly, to an apparatus and a method of wireless communication, which can provide a good communication performance and/or high reliability.

BACKGROUND

New radio (NR) system introduces a multi-transmission/reception point (TRP) based non-coherent joint transmission. Multiple TRPs are connected through backhaul link for coordination. The backhaul link can be ideal or non-ideal. In the case of ideal backhaul, the TRPs can exchange dynamic physical downlink shared channel (PDSCH) scheduling information with short latency and thus different TRPs can coordinate a PDSCH transmission per PDSCH transmission. While, in non-ideal backhaul case, the information exchange between TRPs has large latency and thus the coordination between TRPs can only be semi-static or static.

In current methods, physical uplink shared channel (PUSCH) can only be sent with one transmission configuration that include a sounding reference signal (SRS) resource for port indication and uplink power control parameters. The SRS resource for port indication also implicitly indicate a spatial setting for PUSCH transmission. Due to that design, the UE can only transmit the PUSCH to one TRP. In a multi-TRP system, to increase reliability of PUSCH transmission, the UE can send the same uplink transport block to both TRPs. The current method is not able to support that. The consequence is that the current method cannot utilize diversity of multi-TRP reception to improve uplink reliability.

Therefore, there is a need for an apparatus (such as a user equipment (UE) and/or a base station) and a method of wireless communication, which can solve issues in the prior art, utilize multi-transmission/reception point (TRP) reception, improve uplink reliability, provide a good communication performance, and/or provide high reliability.

SUMMARY

An object of the present disclosure is to propose an apparatus (such as a user equipment (UE) and/or a base station) and a method of wireless communication, which can solve issues in the prior art, utilize multi-transmission/reception point (TRP) reception, improve uplink reliability, provide a good communication performance, and/or provide high reliability.

In a first aspect of the present disclosure, a method of wireless communication by a user equipment (UE) comprises being scheduled with a physical uplink shared channel (PUSCH) with one or more repetition transmissions and being indicated with transmission configurations for the PUSCH with one or more repetition transmissions.

In a second aspect of the present disclosure, a method of wireless communication by a base station comprises scheduling, to a user equipment (UE), a physical uplink shared channel (PUSCH) with one or more repetition transmissions and indicating, to the UE, transmission configurations for the PUSCH with one or more repetition transmissions.

In a third aspect of the present disclosure, a user equipment comprises a memory, a transceiver, and a processor coupled to the memory and the transceiver. The processor is configured to be scheduled with a physical uplink shared channel (PUSCH) with one or more repetition transmissions. The processor is configured to be indicated with transmission configurations for the PUSCH with one or more repetition transmissions.

In a fourth aspect of the present disclosure, a base station comprises a memory, a transceiver, and a processor coupled to the memory and the transceiver. The processor is configured to schedule, to a user equipment (UE), a physical uplink shared channel (PUSCH) with one or more repetition transmissions. The processor is configured to indicate, to the UE, transmission configurations for the PUSCH with one or more repetition transmissions.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In non-coherent joint transmission, different transmission/reception points (TRPs) use different physical downlink control channels (PDCCHs) to schedule physical downlink sharing channel (PDSCH) transmission independently. Each TRP can send one downlink control information (DCI) to schedule one PDSCH transmission. PDSCHs from different TRPs can be scheduled in the same slot or different slots. Two different PDSCH transmissions from different TRPs can be fully overlapped or partially overlapped in PDSCH resource allocation. To support multi-TRP based non-coherent joint transmission, a user equipment (UE) is requested to receive PDCCH from multiple TRPs and then receive PDSCH sent from multiple TRPs. For each PDSCH transmission, the UE can feedback a hybrid automatic repeat request-acknowledge (HARQ-ACK) information to a network. In multi-TRP transmission, the UE can feedback the HARQ-ACK information for each PDSCH transmission to the TRP transmitting the PDSCH. The UE can also feedback the HARQ-ACK information for a PDSCH transmission sent from any TRP to one particular TRP.

Figure 1A:
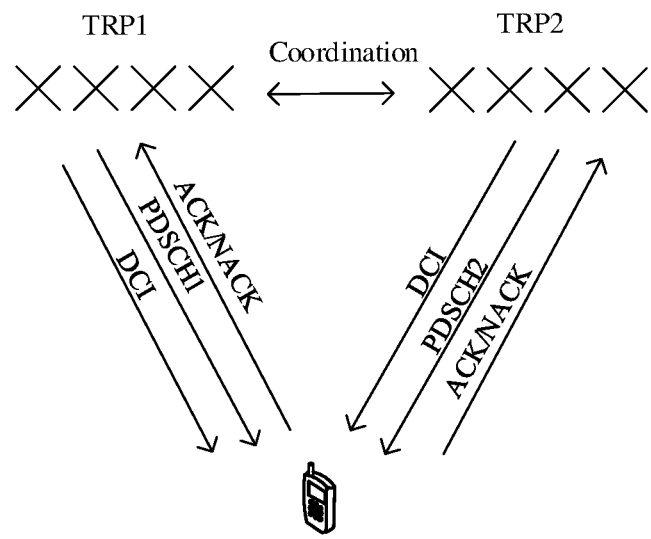
FIG. 1A is a schematic diagram illustrating that example of multi-transmission/reception point (TRP) transmission according to an embodiment of the present disclosure.

An example of multi-TRP based non-coherent joint transmission is illustrated in FIG. 1A. A UE receives a PDSCH based on non-coherent joint transmission from two TRPs: TRP1 and TRP2. As illustrated in FIG. 1A, the TRP1 sends one DCI to schedule a transmission of PDSCH 1 to the UE and the TRP2 sends one DCI to schedule a transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1A, the UE reports HARQ-ACK for PDSCH 1 and PDSCH2 to the TRP1 and the TRP 2, respectively. The TRP1 and the TRP 2 use different control resource sets (CORESETs) and search spaces to transmit DCI scheduling PDSCH transmission to the UE. Therefore, the network can configure multiple CORESETs and search spaces. Each TRP can be associated with one or more CORESETs and also the related search spaces. With such configuration, the TRP would use the associated CORESET to transmit DCI to schedule a PDSCH transmission to the UE. The UE can be requested to decode DCI in CORESETs associated with either TRP to obtain PDSCH scheduling information.

Figure 1B:
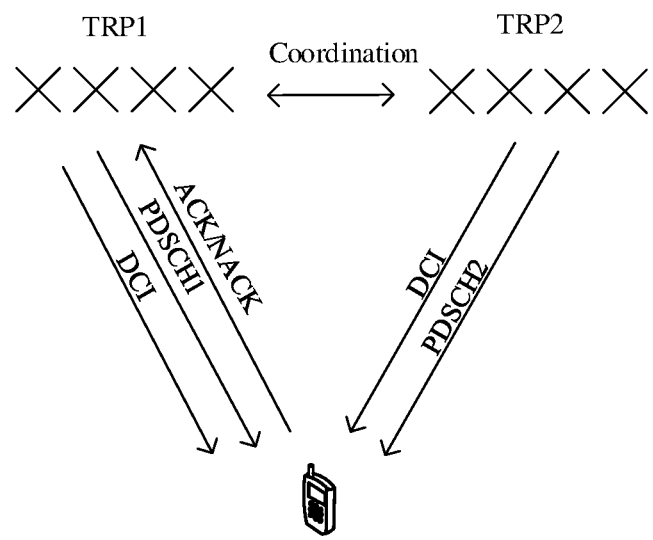
FIG. 1B is a schematic diagram illustrating that example of multi-transmission/reception point (TRP) transmission according to an embodiment of the present disclosure.

Another example of multi-TRP transmission is illustrated in FIG. 1B. A UE receives PDSCH based on non-coherent joint transmission from two TRPs: TRP1 and TRP2. As illustrated in FIG. 1B, the TRP1 sends one DCI to schedule a transmission of PDSCH 1 to the UE and the TRP2 sends one DCI to schedule the transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1B, the UE reports HARQ-ACK for both PDSCH 1 and PDSCH2 to the TRP, which is different from the HARQ-ACK reporting in the example illustrated in FIG. 1A. The example illustrated in FIG. 1B needs ideal backhaul between the TRP 1 and the TRP 2, while the example illustrated in FIG. 1A can be deployed in the scenarios that the backhaul between the TRP 1 and the TRP 2 is ideal or non-ideal.

In new radio/5th generation (NR/5G) systems, a higher layer parameter CORSETPoolIndex is used to differentiate whether multi-TRP transmission is supported in one serving cell or not. In one serving cell, if multi-TRP transmission is supported, CORESETs in that serving cell would be configured with one of two different values for the higher layer parameter CORESETPoolIndex. In details, in one bandwidth part (BWP) of the serving cell, if the UE is provided with higher layer parameter CORESETPoolIndex with a value of 0 or not provided with higher layer parameter for some CORESETs and is provided with higher layer parameter CORESETPoolIndex with a value of 1 for other CORESET(s), then multi-TRP transmission is supported for that UE in the BWP of the serving cell.

In one active BWP of a serving cell, the UE can be configured with one of the following HARQ-ACK feedback modes: a joint HARQ-ACK feedback mode and a separate HARQ-ACK feedback mode. In the joint HARQ-ACK feedback mode, the HARQ-ACK bits for PDSCHs from all the TRPs are multiplexed in one same HARQ codebook and then the UE reports that HARQ-ACK codebook in one physical uplink control channel (PUCCH) or physical uplink shared channel (PUSCH) to the system. In contrast, in the separate HARQ-ACK feedback mode, the UE generates HARQ-ACK codebook for the PDSCHs of each TRP separately and then reports each HARQ-ACK codebook separately in different PUCCH transmissions or PUSCH transmissions. In separate HARQ-ACK transmission, the UE would assume the PUCCHs carrying HARQ-ACK bits for different TRPs are not overlapped in time domain.

Current 5G specification supports two methods of PUSCH repetition transmission: slot-based repetition and mini-slot repetition. In slot-based repetition (i.e., Type A repetition), the UE is indicated with a repetition number K for the PUSCH transmission and the same symbol allocation is applied across K consecutive slots and the PUSCH is limited to a single transmission layer. The UE may repeat the transport block (TB) across K consecutive slots applying the same symbol allocation in each slot.

In mini-slot based repetition (i.e., type B repetition), the UE is indicated with a repetition number of K for the PUSCH transmission and the UE transmits the K PUSCH repetition in consecutive symbols. The UE determines the symbol location and slot location for each nominal PUSCH repetition of type B as follows. For PUSCH repetition type B, the number of nominal repetitions is given by numberofrepetitions. For the n-th nominal repetition, n=0, . . . , numberofrepetitions−1. The slot where the nominal repetition starts is given by $$K_s + \left\lfloor \frac{S + n \cdot L}{N_{symb}^{slot}} \right\rfloor,$$

and the starting symbol relative to the start of the slot is given by $mod(s+n \cdot L, N_{symb}^{slot})$. The slot where the nominal repetition ends is given by $$K_s + \left\lfloor \frac{S + (n+1) \cdot L - 1}{N_{symb}^{slot}} \right\rfloor,$$

and the ending symbol relative to the start of the slot is given by mod(s+(n+1)·L−1, $N_{symb}^{slot}$). Here $K_s$ is the slot where the PUSCH transmission starts, and $N_{symb}^{slot}$ is the number of symbols per slot.

For PUSCH repetition Type B, the UE may first determine invalid symbols for PUSCH repetition type B according some conditions. For PUSCH repetition Type B, after determining the invalid symbol(s) for PUSCH repetition type B transmission for each of the K nominal repetitions, the remaining symbols are considered as potentially valid symbols for PUSCH repetition Type B transmission. If the number of potentially valid symbols for PUSCH repetition type B transmission is greater than zero for a nominal repetition, the nominal repetition consists of one or more actual repetitions, where each actual repetition consists of a consecutive set of potentially valid symbols that can be used for PUSCH repetition Type B transmission within a slot. An actual repetition is omitted according to the conditions as defined by the slot format determination. The redundancy version to be applied on the nth actual repetition (with the counting including the actual repetitions that are omitted) is determined according to the following table.

TABLE

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 2:
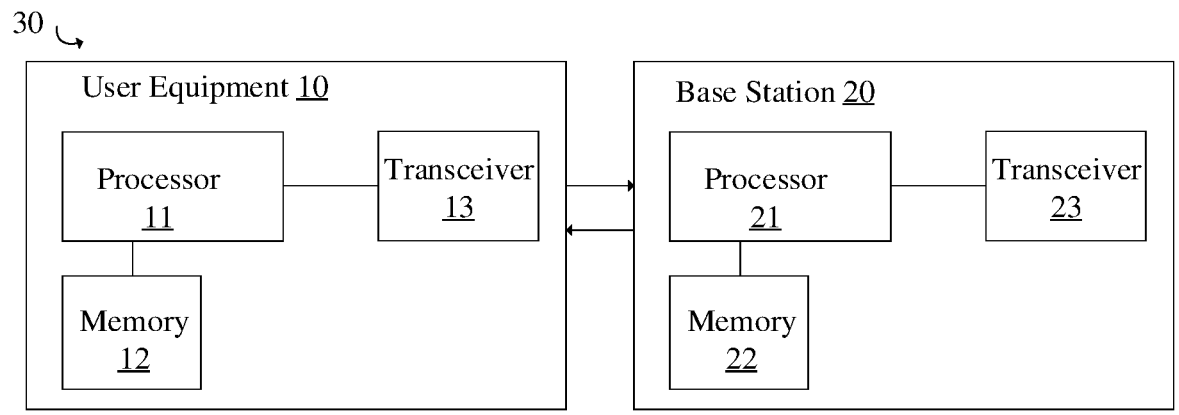
FIG. 2 is a block diagram of one or more user equipments (UEs) and a base station (e.g., gNB or eNB) of communication in a communication network system according to an embodiment of the present disclosure.

FIG. 2 illustrates that, in some embodiments, one or more user equipments (UEs) 10 and a base station (e.g., gNB or eNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to be scheduled with a physical uplink shared channel (PUSCH) with one or more repetition transmissions. The processor 11 is configured to be indicated with transmission configurations for the PUSCH with one or more repetition transmissions. This can solve issues in the prior art, utilize multi-transmission/reception point (TRP) reception, improve uplink reliability, provide a good communication performance, and/or provide high reliability.

In some embodiments, the processor 21 is configured to schedule, to the UE 10, a physical uplink shared channel (PUSCH) with one or more repetition transmissions. The processor 21 is configured to indicate, to the UE 10, transmission configurations for the PUSCH with one or more repetition transmissions. This can solve issues in the prior art, utilize multi-transmission/reception point (TRP) reception, improve uplink reliability, provide a good communication performance, and/or provide high reliability.

Figure 3:
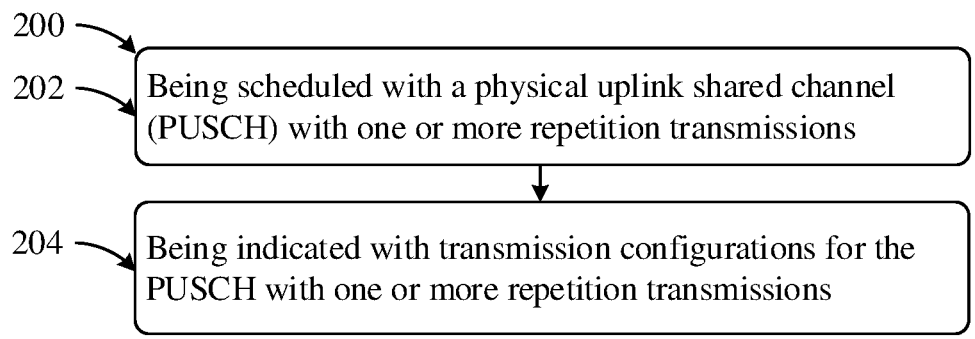
FIG. 3 is a flowchart illustrating a method of wireless communication by a user equipment (UE) according to an embodiment of the present disclosure.

FIG. 3 illustrates a method 200 of wireless communication by a user equipment (UE) 10 according to an embodiment of the present disclosure. In some embodiments, the method 200 includes: a block 202, being scheduled with a physical uplink shared channel (PUSCH) with one or more repetition transmissions, and a block 204, being indicated with transmission configurations for the PUSCH with one or more repetition transmissions. This can solve issues in the prior art, utilize multi-transmission/reception point (TRP) reception, improve uplink reliability, provide a good communication performance, and/or provide high reliability.

Figure 4:
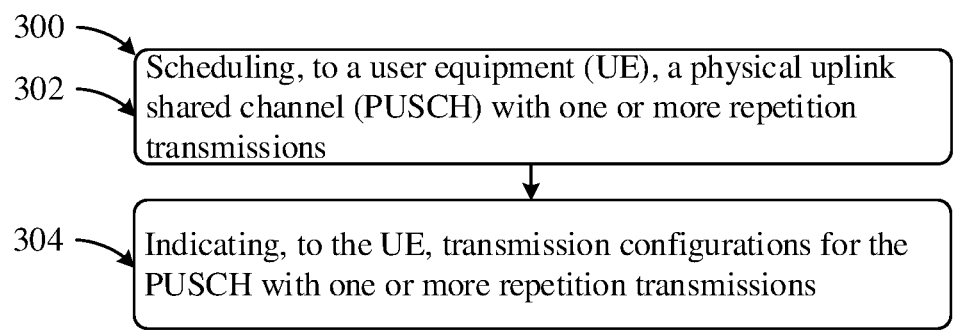
FIG. 4 is a flowchart illustrating a method of wireless communication by a base station according to an embodiment of the present disclosure.

FIG. 4 illustrates a method 300 of wireless communication by a base station 20 according to an embodiment of the present disclosure. In some embodiments, the method 300 includes: a block 302, scheduling, to a user equipment (UE), a physical uplink shared channel (PUSCH) with one or more repetition transmissions, and a block 304, indicating, to the UE, transmission configurations for the PUSCH with one or more repetition transmissions. This can solve issues in the prior art, utilize multi-transmission/reception point (TRP) reception, improve uplink reliability, provide a good communication performance, and/or provide high reliability.

In some embodiments, the transmission configurations comprise transmission configuration indicator (TCI) states and/or higher layer parameters configured to provide a mapping between a sounding reference signal (SRS) resource indicator (SRI) and PUSCH power control parameters. In some embodiments, each of the TCI states comprises a transmission mode of the PUSCH, one or more SRS resources for port indication, a spatial relation configuration, and/or one or more uplink power control parameters. In some embodiments, the higher layer parameters comprise SRI-PUSCH-PowerControl parameters, and each of the SRI-PUSCH-PowerControl parameters comprises a sri-PUSCH-PowerControlId parameter, a sri-PUSCH-PathlossReferenceRS-Id parameter, a sri-P0-PUSCH-AlphaSetId parameter, and/or a sri-PUSCH-ClosedLoopIndex parameter. In some embodiments, the UE is requested to apply an indicated transmission configuration on one or more PUSCH repetition transmissions.

In some embodiments, the PUSCH with one or more repetition transmissions comprise a PUSCH type A repetition and a PUSCH type B repetition. In some embodiments, for the PUSCH type A repetition, an indicated transmission configuration is applied on each PUSCH transmission. In some embodiments, for the PUSCH type B repetition, an indicated transmission configuration is applied on each nominal repetition or each actual repetition. In some embodiments, the UE is scheduled with the PUSCH with one or more repetition transmissions through downlink control information (DCI). In some embodiments, the DCI comprises a DCI format 0_1 or a DCI format 0_2. In some embodiments, one or more TCI states or one or more higher layer parameters are mapped to one or more codepoints of a DCI field in the DCI. In some embodiments, the DCI indicates a first SRI DCI field and a second SRI DCI field, the first SRI DCI field indicates one or more SRS resources and one SRI-PUSCH-PowerControl parameter, and/or the second SRI DCI field indicates one or more SRS resources and one SRI-PUSCH-PowerControl parameter.

In some embodiments, a mapping pattern of applying an indicated transmission configuration is performed on each PUSCH transmission occasion. In some embodiments, the mapping pattern is configured by radio resource control (RRC). In some embodiments, the mapping pattern is mapped to one or more codepoints of a DCI field of the DCI by a medium access control (MAC) control element (CE). In some embodiments, an SRI bit field of the DCI indicates one or two combinations of SRS resources and uplink power control parameters. In some embodiments, for the PUSCH type A repetition and/or the PUSCH type B repetition, one or more indicated combinations of SRS resources and uplink power control parameters are applied on each PUSCH transmission occasion. In some embodiments, a mapping between an SRI codepoint to one or more indicated combinations of SRS resources and uplink power control parameters is configured in an RRC. In some embodiments, a mapping between an SRI codepoint to one or more indicated combinations of SRS resources and uplink power control parameters is activated by a MAC CE. In some embodiments, bit fields in the DCI indicate indicated combinations of SRS resources and uplink power control parameters for the PUSCH type A repetition and/or the PUSCH type B repetition.

In one embodiment, a UE can be scheduled with a PUSCH with repetition transmission through DCI format 0_1 or 0_2. For the PUSCH with repetition transmission, the UE can be indicated with two (two is used an example here, it can be any number>1) transmission configurations, each of which can contains SRS resource(s) for PUSCH port indication, spatial setting, and/or uplink power control parameter, for PUSCH with repetition transmission. The UE can be requested to apply the indicated transmission configuration on each PUSCH transmission among those repetition transmissions according to a predefined or configured application pattern. In one example, the UE is scheduled with a PUSCH transmission with 4 repetitions and the UE is indicated with two transmission configurations: a first transmission configuration and a second transmission configuration. The UE can be requested to apply one of the first transmission configuration and the second transmission configuration on each PUSCH repetition transmission. For example, the UE may apply the first transmission configuration on the $1^{st}$ and $3^{rd}$ PUSCH repetition transmissions and apply the second transmission configuration on the $2^{nd}$ and $4^{th}$ PUSCH repetition transmissions.

In a first exemplary method, a UE can be configured with a list of M UL TCI states for PUSCH transmission. Each UL TCI state can contain one or more of the following information for PUSCH transmission:

Transmission mode of a PUSCH: for example, it can be codebook-based PUSCH transmission or non-codebook-based PUSCH transmission.

One or more SRS resources for port indication.

Spatial relation configuration to provide the configuration information for the UE to derive spatial domain transmission filter, which can be provided with a SS/PBCH block index, CSI-RS resource ID or SRS resource ID.

Uplink power control parameters including p0, alpha, pathloss RS, and closedloop index.

The UE can receive a MAC CE command that activate up to, for example, 8 combinations of one or two UL TCI states for PUSCH transmission and each combination of one or two UL TCI states is mapped to one codepoint of a first DCI field in the DCI format scheduling PUSCH transmission for example DCI format 0_1 or 0_2. For a PUSCH transmission with Type A or Type B repetition scheduled by a DCI format, for example DCI format 0_1 or 0_2, the first DCI field in the DCI format can indicate two UL TCI states for the PUSCH transmission, the UE may apply those two indicated UL TCI states on each PUSCH transmission according some predefined rule or configured pattern. Those two UL TCI states indicated by the first DCI field are called the first TCI state and the second TCI state here.

In one example, if the PUSCH repetition is Type A, the same symbol allocation for PUSCH is applied across K consecutive slots, where the K is the number of repetitions indicated to the UE. The UE may repeat the TB across the K consecutive slots applying the same symbol allocation in each slot. The UE can be requested to apply the first UL TCI state and the second TCI state on PUSCH transmission occasions according to one or more of the following patterns:

For example, When K=2, the first UL TCI state is applied to the first PUSCH transmission occasion and the second UL TCI state is applied to the second PUSCH transmission occasion.

For example, when K>2, the first and second UL TCI states are applied to the first and second PUSCH transmission occasions, respectively, and the same UL TCI mapping pattern continues to the remaining PUSCH transmission occasions.

For example, when K>2, first UL TCI state is applied to the first and second PUSCH transmissions, and the second UL TCI state is applied to the third and fourth PUSCH transmissions, and the same UL TCI mapping pattern continues to the remaining PUSCH transmission occasions.

For example, the first UL TCI state is applied to all the n-th (n=1, 3, 5, . . . ) PUSCH transmissions and the second UL TCI state is applied to all the n-th with n=2, 4, 6, . . . PUSCH transmissions.

For example, the first UL TCI state is applied n-th $$\left(n = 1, \ldots, \left\lfloor \frac{K+1}{2} \right\rfloor\right)$$

PUSCH transmissions and the second UL TCI state is applied to n-th PUSCH transmission with $$n = \left\lfloor \frac{K+1}{2} \right\rfloor + 1, \ldots, K.$$

For example, the first UL TCI state is applied n-th $$\left(n = 1, \ldots, \left\lfloor \frac{K}{2} \right\rfloor\right)$$

PUSCH transmissions and the second UL TCI state is applied to n-th PUSCH transmission with $$n = \left\lfloor \frac{K}{2} \right\rfloor + 1, \ldots, K.$$

In one example, if a PUSCH repetition is Type B, the UE is indicated with the starting symbol S, length L and the number of nominal repetitions numberofrepetitions. The UE may first determine the slot and symbol location for each of the nominal repetition. The UE determines invalid symbol(s) and then determine actual PUSCH repetition(s).

In a first example, the UE can be requested to map the first UL TCI state and the second UL TCI state to each nominal repetition. The UE can be requested to map the first UL TCI state and the second TCI state to each nominal repetition as one or more of the following methods:

For example, when numberofrepetitions=2, the first UL TCI state is applied to the first nominal repetition and the second UL TCI state is applied to the second nominal repetition.

For example, when numberofrepetitions>2, the first and second UL TCI states are applied to the first and second nominal repetitions, respectively, and the same UL TCI mapping pattern continues to the remaining nominal repetitions.

For example, when numberofrepetitions>2, first UL TCI state is applied to the first and second nominal repetitions, and the second UL TCI state is applied to the third and fourth nominal repetitions, and the same UL TCI mapping pattern continues to the remaining nominal repetitions.

For example, the first UL TCI state is applied to all the n-th (n=1, 3, 5, . . . ) nominal repetitions and the second UL TCI state is applied to all the n-th (n=2, 4, 6, . . . ) nominal repetitions.

For example, the first UL TCI state is applied n-th with $$n = 1, \ldots, \left\lfloor \frac{K+1}{2} \right\rfloor,$$

nominal repetitions and the second UL TCI state is applied to n-th nominal repetitions with $$n = \left\lfloor \frac{K+1}{2} \right\rfloor + 1, \ldots, K,$$

where K=numberofrepetitions.

For example, the first UL TCI state is applied n-th with $$n = 1, \ldots, \left\lfloor \frac{K}{2} \right\rfloor,$$

nominal repetitions and the second UL TCI state is applied to n-th nominal repetitions with $$n = \left\lfloor \frac{K}{2} \right\rfloor + 1, \ldots, K,$$

where K=numberofrepetitions.

In a second example, the UE can be requested to map the first UL TCI state and the second UL TCI state to each actual repetition. The UE can be requested to map the first UL TCI state and the second TCI state to each actual repetition as one or more of the following methods:

For example, when number of actual repetitions is 2, the first UL TCI state is applied to the first actual repetition and the second UL TCI state is applied to the second actual repetition.

For example, when number of actual repetitions is >2, the first and second UL TCI states are applied to the first and second actual repetitions, respectively, and the same UL TCI mapping pattern continues to the remaining actual repetitions.

For example, when number of actual repetitions is >2, first UL TCI state is applied to the first and second actual repetitions, and the second UL TCI state is applied to the third and fourth actual repetitions, and the same UL TCI mapping pattern continues to the remaining actual repetitions.

For example, the first UL TCI state is applied to all the n-th (n=1, 3, 5, . . . ) actual repetitions and the second UL TCI state is applied to all the n-th (n=2, 4, 6, . . . ) actual repetitions.

For example, the first UL TCI state is applied n-th with $$n = 1, \ldots, \left\lfloor \frac{K+1}{2} \right\rfloor,$$

actual repetitions and the second UL TCI state is applied to n-th actual repetitions with $$n = \left\lfloor \frac{K+1}{2} \right\rfloor + 1, \ldots, K,$$

where K=numberofrepetitions.

For example, the first UL TCI state is applied n-th with $$n = 1, \ldots, \left\lfloor \frac{K}{2} \right\rfloor,$$

actual repetitions and the second UL TCI state is applied to n-th actual repetitions with $$n = \left\lfloor \frac{K}{2} \right\rfloor + 1, \ldots, K,$$

where K=numberofrepetitions.

In a second exemplary method, a UE can be configured with a list of M SRI-PUSCH-PowerControl. And the UE can receive one MAC CE that can map one or two SRI-PUSCH-PowerControl to one codepoint of a DCI field (for example the SRS resource indicator DCI field) of one DCI format scheduling PUSCH transmission. In each SRI-PUSCH-PowerControl, the UE is provided with the following parameters:

sri-PUSCH-PowerControlId: that indicates one or more SRS resources configured for PUSCH transmission.

sri-PUSCH-PathlossReferenceRS-Id:n that provides one DL RS ID for pathloss reference signal.

sri-P0-PUSCH-AlphaSetId: that provides the p0 and alphas for uplink power control.

sri-PUSCH-ClosedLoopIndex: that provides the closed loop index for uplink power control.

For a PUSCH transmission with Type A or Type repetition scheduled by a DCI format, for example DCI format 0_1 or 0_2, the DCI field (for example the SRS resource indicator DCI field) in the DCI format can indicate two SRI-PUSCH-PowerControl for the PUSCH transmission, the UE may apply those two indicated SRI-PUSCH-PowerControl on each PUSCH transmission according some predefined rule or configured pattern. Those two SRI-PUSCH-PowerControl indicated by the DCI field are called the first TCI state and the second TCI state here.

In one example, if the PUSCH repetition is Type A, the same symbol allocation for PUSCH is applied across K consecutive slots, where the K is the number of repetitions indicated to the UE. The UE may repeat the TB across the K consecutive slots applying the same symbol allocation in each slot. The UE can be requested to apply the first SRI-PUSCH-PowerControl and the second SRI-PUSCH-PowerControl on PUSCH transmission occasions according to one or more of the following patterns:

For example, When K=2, the first SRI-PUSCH-PowerControl is applied to the first PUSCH transmission occasion and the second SRI-PUSCH-PowerControl is applied to the second PUSCH transmission occasion.

For example, when K>2, the first and second SRI-PUSCH-PowerControl are applied to the first and second PUSCH transmission occasions, respectively, and the same SRI-PUSCH-PowerControl mapping pattern continues to the remaining PUSCH transmission occasions.

For example, when K>2, first SRI-PUSCH-PowerControl is applied to the first and second PUSCH transmissions, and the second SRI-PUSCH-PowerControl is applied to the third and fourth PUSCH transmissions, and the same SRI-PUSCH-PowerControl mapping pattern continues to the remaining PUSCH transmission occasions.

For example, the first SRI-PUSCH-PowerControl is applied to all the n-th (n=1, 3, 5, . . . ) PUSCH transmissions and the second SRI-PUSCH-PowerControl is applied to all the n-th with n=2, 4, 6, . . . PUSCH transmissions.

For example, the first SRI-PUSCH-PowerControl is applied n-th $$\left(n = 1, \ldots, \left\lfloor \frac{K+1}{2} \right\rfloor\right)$$

PUSCH transmissions and the second SRI-PUSCH-PowerControl is applied to n-th PUSCH transmission with $$n = \left\lfloor \frac{K+1}{2} \right\rfloor + 1, \ldots, K.$$

For example, the first SRI-PUSCH-PowerControl is applied n-th $$\left(n = 1, \ldots, \left\lfloor \frac{K}{2} \right\rfloor\right)$$

PUSCH transmissions and the second SRI-PUSCH-PowerControl is applied to n-th PUSCH transmission with $$n = \left\lfloor \frac{K}{2} \right\rfloor + 1, \ldots, K.$$

In one example, if a PUSCH repetition is Type B, the UE is indicated with the starting symbol S, length L and the number of nominal repetitions numberofrepetitions. The UE may first determine the slot and symbol location for each of the nominal repetition. The UE determines invalid symbol(s) and then determine actual PUSCH repetition(s).

In a first example, the UE can be requested to map the first SRI-PUSCH-PowerControl and the second SRI-PUSCH-PowerControl to each nominal repetition. The UE can be requested to map the first SRI-PUSCH-PowerControl and the second SRI-PUSCH-PowerControl to each nominal repetition as one or more of the following methods:

For example, when numberofrepetitions=2, the first SRI-PUSCH-PowerControl is applied to the first nominal repetition and the second SRI-PUSCH-PowerControl is applied to the second nominal repetition.

For example, when numberofrepetitions>2, the first and second SRI-PUSCH-PowerControl are applied to the first and second nominal repetitions, respectively, and the same SRI-PUSCH-PowerControl mapping pattern continues to the remaining nominal repetitions.

For example, when numberofrepetitions>2, first SRI-PUSCH-PowerControl is applied to the first and second nominal repetitions, and the second SRI-PUSCH-PowerControl is applied to the third and fourth nominal repetitions, and the same SRI-PUSCH-PowerControl mapping pattern continues to the remaining nominal repetitions.

For example, the first SRI-PUSCH-PowerControl is applied to all the n-th (n=1, 3, 5, . . . ) nominal repetitions and the second SRI-PUSCH-PowerControl is applied to all the n-th (n=2, 4, 6, . . . ) nominal repetitions.

For example, the first SRI-PUSCH-PowerControl is applied n-th with $$n = 1, \ldots, \left\lfloor \frac{K+1}{2} \right\rfloor,$$

nominal repetitions and the second SRI-PUSCH-PowerControl is applied to n-th nominal repetitions with $$n = \left\lfloor \frac{K+1}{2} \right\rfloor + 1, \ldots, K,$$

where K=numberofrepetitions.

For example, the first SRI-PUSCH-PowerControl is applied n-th with $$n = 1, \ldots, \left\lfloor \frac{K}{2} \right\rfloor,$$

nominal repetitions and the second SRI-PUSCH-PowerControl is applied to n-th nominal repetitions with $$n = \left\lfloor \frac{K}{2} \right\rfloor + 1, \ldots, K,$$

where K=numberofrepetitions.

In a second example, the UE can be requested to map the first SRI-PUSCH-PowerControl and the second SRI-PUSCH-PowerControl to each actual repetition. The UE can be requested to map the first SRI-PUSCH-PowerControl and the second SRI-PUSCH-PowerControl to each actual repetition as one or more of the following methods:

For example, when number of actual repetitions is 2, the first SRI-PUSCH-PowerControl is applied to the first actual repetition and the second SRI-PUSCH-PowerControl is applied to the second actual repetition.

For example, when number of actual repetitions is >2, the first and second SRI-PUSCH-PowerControl are applied to the first and second actual repetitions, respectively, and the same SRI-PUSCH-PowerControl mapping pattern continues to the remaining actual repetitions.

For example, when number of actual repetitions is >2, first SRI-PUSCH-PowerControl is applied to the first and second actual repetitions, and the second SRI-PUSCH-PowerControl is applied to the third and fourth actual repetitions, and the same SRI-PUSCH-PowerControl mapping pattern continues to the remaining actual repetitions.

For example, the first SRI-PUSCH-PowerControl is applied to all the n-th (n=1, 3, 5, . . . ) actual repetitions and the second SRI-PUSCH-PowerControl is applied to all the n-th (n=2, 4, 6, . . . ) actual repetitions.

For example, the first SRI-PUSCH-PowerControl is applied n-th with $$n = 1, \ldots, \left\lfloor \frac{K+1}{2} \right\rfloor,$$

actual repetitions and the second SRI-PUSCH-PowerControl is applied to n-th actual repetitions with $$n = \left\lfloor \frac{K+1}{2} \right\rfloor + 1, \ldots, K,$$

where K=numberofrepetitions.

For example, the first SRI-PUSCH-PowerControl is applied n-th with $$n = 1, \ldots, \left\lfloor \frac{K}{2} \right\rfloor,$$

actual repetitions and the second SRI-PUSCH-PowerControl is applied to n-th actual repetitions with $$n = \left\lfloor \frac{K}{2} \right\rfloor + 1, \ldots, K,$$

where K=numberofrepetitions.

In a third exemplary method, a DCI format scheduling PUSCH transmission, for example DCI format 0_1 or 0_2 can indicate one SRS resource indicator DCI field and one SRS resource indictor-2 DCI field. The SRS resource indicator DCI field can indicate one or more SRS resources and one SRI-PUSCH-PowerControl. And the SRS resource indicator-2 DCI field can also indicate one or more SRS resources and one SRI-PUSCH-PowerControl. For a PUSCH transmission with Type A or Type repetition scheduled by a DCI format, for example DCI format 0_1 or 0_2, the UE may apply the SRS resource(s) and SRI-PUSCH-PowerControl indicated by the DCI field SRS resource indicator and the SRS resource(s) and SRI-PUSCH-PowerControl indicated by the DCI field SRS resource indicator-2 on each PUSCH transmission according some predefined rule or configured pattern. The UE can the UE may apply the SRS resource(s) and SRI-PUSCH-PowerControl indicated by the DCI field SRS resource indicator and the SRS resource(s) and SRI-PUSCH-PowerControl indicated by the DCI field SRS resource indicator-2 on each PUSCH transmission occasion of PUSCH repetition type A according the methods described in this disclosure.

In a fourth exemplary method, the UE can be configured with a mapping pattern to describe how the UE may apply the indicated UL TCI states (or indicated combinations of SRS resources and uplink power control parameters) to the PUSCH transmission occasions or PUSCH repetitions.

In one example, the UE can be configured with a mapping pattern in RRC.

In one example, the UE can be configured with a list of mapping patterns and the UE can be indicated with an association between mapping patterns to the codepoints of a first DCI field in DCI format scheduling PUSCH transmissions. For example, the UE receives one MAC CE command that maps up to, e.g., 4 or 8, mapping pattern to the codepoints of the first DCI field in the DCI format scheduling PUSCH transmissions.

For a PUSCH with repetition scheduled by for example DCI format 0_1 or 0_2, the UE can be indicated with two UL TCI states by a DCI field and the UE can be indicated with a mapping pattern by the first DCI field. Then then UE may apply the indicated UL TCI states on the PUSCH transmission occasions or PUSCH repetition (for example nominal repetition, for example actual repetition) by following the indicated mapping pattern.

In summary, in some embodiment of this disclosure, the methods for transmitting PUSCH in multi-TRP system are presented:

The UE is configured with M TCI states for PUSCH transmission and each TCI state include the information of SRS resource(s) for port indication, spatial relation configuration, and/or uplink power control parameters. The gNB can map one or two TCI states to one codepoint of a first DCI field in the DCI format 0_1 or 0_2.

For a PUSCH with repetition Type A, the UE can apply the indicated TCI state on each PUSCH transmission.

For PUSCH Type B repetition:

Alteration (Alt) 1: indicated UL TCI states are applied on each nominal repetition Alt 2: indicated UL TCI states are applied on each actual repetition.

The mapping pattern of applying TCI state on each PUSCH transmission occasion:

The mapping pattern can be configured by RRC.

A MAC CE maps the mapping pattern to the codepoints of a DCI field and DCI dynamically indicate one mapping pattern.

The SRI bit field in DCI format 0_1 or 0_2 can indicate one or two combinations of SRS resources and uplink power control parameters. For a PUSCH with repetition Type A or Type B, the UE may apply the indicated configuration combinations of SRS resource(s) and uplink power control parameters on each PUSCH transmission occasion:

The mapping between SRI codepoint to the combination of SRS resources and uplink power control parameters is configured in RRC.

The mapping between SRI codepoint to the combination(s) of SRS resources and uplink power control parameters is activated by MAC CE.

Use two bit fields in DCI format to indicate two combination of SRS resource(s) and uplink power control parameters for PUSCH with repetition Type A and Type B.

Abbreviations

| | |
|---|---|
| 3GPP | 3$^{rd}$ Generation Partnership Project |
| 5G | 5$^{th}$ Generation |
| NR | New Radio |
| gNB | Next generation NodeB |
| DL | Downlink |
| UL | Uplink |
| PUSCH | Physical Uplink Shared Channel |
| PUCCH | Physical Uplink Control Channel |
| PDSCH | Physical Downlink Shared Channel |
| PDCCH | Physical Downlink Control Channel |
| SRS | Sounding Reference Signal |
| CSI | Channel state information |
| CSI-RS | Channel state information reference signal |
| RS | Reference Signal |
| CORESET | Control Resource Set |
| DCI | Downlink control information |
| TRP | Transmission/reception point |
| ACK | Acknowledge |
| NACK | Non-Acknowledge |
| UCI | Uplink control information |
| RRC | Radio Resource Control |
| HARQ | Hybrid Automatic Repeat Request |
| MAC | Media Access Control |
| MAC CE | Media Access Control Control Element |
| CRC | Cyclic Redundancy Check |
| RNTI | Radio Network Temporary Identity |
| RB | Resource Block |
| PRB | Physical Resource Block |
| NW | Network |
| RSRP | Reference signal received power |
| L1-RSRP | Layer 1 Reference signal received power |
| TCI | Transmission Configuration Indicator |
| Tx | Transmission |
| Rx | Receive |
| QCL | Quasi co-location |
| SSB | SS/PBCH Block |
| PT-RS | Phase Tracking Reference Signal |

Commercial interests for some embodiments are as follows. 1. Solving issues in the prior art. 2. Utilizing multi-transmission/reception point (TRP) reception. 3. Improving uplink reliability. 4. Providing a good communication performance. 5. Providing high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms. The present example embodiment is applicable to NR in unlicensed spectrum (NR-U). The present disclosure can be applied to other mobile networks, in particular to mobile network of any further generation cellular network technology (6G, etc.).

Figure 5:
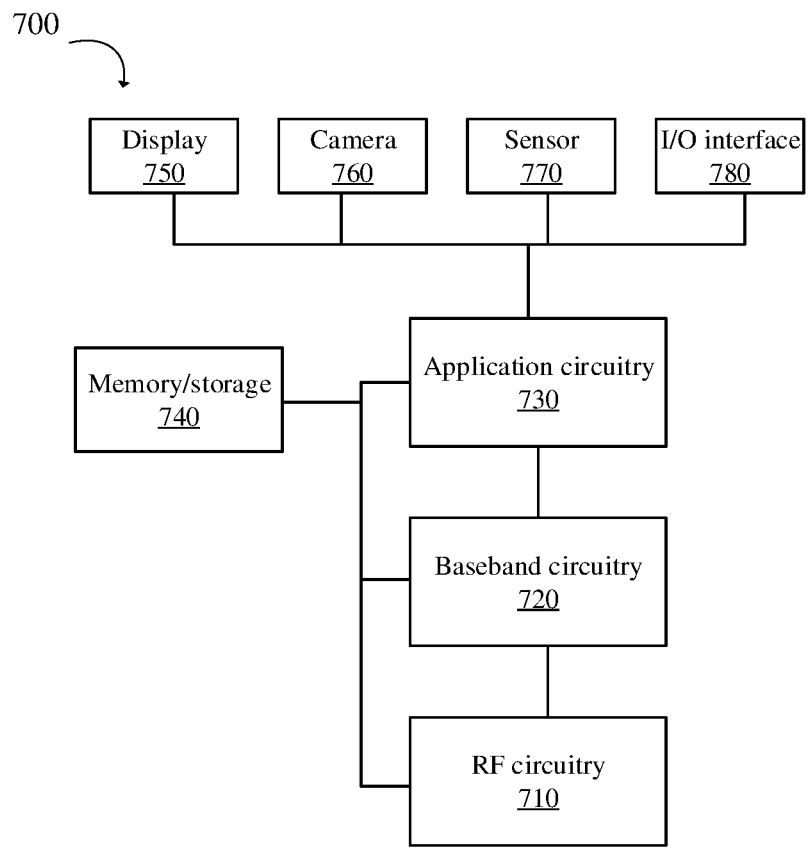
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
being scheduled with a physical uplink shared channel (PUSCH) with one or more repetition transmissions;
being indicated with transmission configurations for the PUSCH with one or more repetition transmissions, wherein if a PUSCH repetition is Type A, the same symbol allocation for PUSCH is applied across K consecutive slots, K being a number of repetitions indicated to the UE; and
being requested to apply a first uplink (UL) transmission configuration indicator (TCI) state and a second UL TCI state on PUSCH transmission occasions;
wherein when K>2, the first UL TCI state is applied to a first PUSCH transmission occasion and a second PUSCH transmission occasion, the second UL TCI state is applied to a third PUSCH transmission occasion and a fourth PUSCH transmission occasion, and the same UL TCI mapping pattern continues to remaining PUSCH transmission occasions.

2. The method of claim 1, wherein the UE is requested to apply an indicated transmission configuration on one or more PUSCH repetition transmissions, and/or the PUSCH with one or more repetition transmissions comprise a PUSCH type A repetition and a PUSCH type B repetition.

3. The method of claim 2, wherein for the PUSCH type A repetition, an indicated transmission configuration is applied on each PUSCH transmission, and/or for the PUSCH type B repetition, the indicated transmission configuration is applied on each nominal repetition or each actual repetition.

4. The method of claim 2, wherein the UE is scheduled with the PUSCH with one or more repetition transmissions through downlink control information (DCI), and the DCI comprises a DCI format 0_1 or a DCI format 0_2.

5. The method of claim 4, wherein the DCI indicates a first SRI DCI field and a second SRI DCI field, the first SRI DCI field indicates one or more SRS resources and one SRI-PUSCH-PowerControl parameter, and/or the second SRI DCI field indicates one or more SRS resources and one SRI-PUSCH-PowerControl parameter.

6. The method of claim 4, wherein a mapping pattern of applying an indicated transmission configuration is performed on each PUSCH transmission occasion; and the mapping pattern is configured by radio resource control (RRC).

7. The method of claim 1, wherein if the PUSCH repetition is Type B, the UE is indicated with a starting symbol, a length and a number of nominal repetitions (numberofrepetitions), the UE determines a slot location and a symbol location for each of the nominal repetitions; and the UE determines at least one invalid symbol and at least one actual PUSCH repetition.

8. The method of claim 7, wherein when numberofrepetitions=2, the first UL TCI state is applied to a first nominal repetition and the second UL TCI state is applied to a second nominal repetition.

9. A user equipment (UE), comprising:
a memory;
a transceiver; and
a processor coupled to the memory and the transceiver;
wherein the processor is configured to be scheduled with a physical uplink shared channel (PUSCH) with one or more repetition transmissions;
the processor is configured to be indicated with transmission configurations for the PUSCH with one or more repetition transmissions, wherein if a PUSCH repetition is Type A, the same symbol allocation for PUSCH is applied across K consecutive slots, K being a number of repetitions indicated to the UE; and
the processor is configured to be requested to apply a first uplink (UL) transmission configuration indicator (TCI) state and a second UL TCI state on PUSCH transmission occasions;
wherein when K>2, the first UL TCI state is applied to a first PUSCH transmission occasion and a second PUSCH transmission occasion, the second UL TCI state is applied to a third PUSCH transmission occasion and a fourth PUSCH transmission occasion, and the same UL TCI mapping pattern continues to remaining PUSCH transmission occasions.

10. The UE of claim 9, wherein the processor is requested to apply an indicated transmission configuration on one or more PUSCH repetition transmissions, and/or the PUSCH with one or more repetition transmissions comprise a PUSCH type A repetition and a PUSCH type B repetition.

11. The UE of claim 10, wherein for the PUSCH type A repetition, an indicated transmission configuration is applied on each PUSCH transmission, and/or for the PUSCH type B repetition, the indicated transmission configuration is applied on each nominal repetition or each actual repetition.

12. The UE of claim 10, wherein the processor is scheduled with the PUSCH with one or more repetition transmissions through downlink control information (DCI), and the DCI comprises a DCI format 0_1 or a DCI format 0_2.

13. The UE of claim 12, wherein the DCI indicates a first SRI DCI field and a second SRI DCI field, the first SRI DCI field indicates one or more SRS resources and one SRI-PUSCH-PowerControl parameter, and/or the second SRI DCI field indicates one or more SRS resources and one SRI-PUSCH-PowerControl parameter; and/or wherein a mapping pattern of applying an indicated transmission configuration is performed on each PUSCH transmission occasion, and the mapping pattern is configured by radio resource control (RRC).

14. The UE of claim 9, wherein if the PUSCH repetition is Type B, the UE is indicated with a starting symbol, a length and a number of nominal repetitions (numberofrepetitions), the processor is configured to determine a slot location and a symbol location for each of the nominal repetitions, and the processor is configured to determine at least one invalid symbol and at least one actual PUSCH repetition;
wherein when numberofrepetitions=2, the first UL TCI state is applied to a first nominal repetition and the second UL TCI state is applied to a second nominal repetition.

15. A base station, comprising:
a memory;
a transceiver; and
a processor coupled to the memory and the transceiver;
wherein the processor is configured to schedule, to a user equipment (UE), a physical uplink shared channel (PUSCH) with one or more repetition transmissions;
the processor is configured to indicate, to the UE, transmission configurations for the PUSCH with one or more repetition transmissions, wherein if a PUSCH repetition is Type A, the same symbol allocation for PUSCH is applied across K consecutive slots, K being a number of repetitions indicated to the UE; and
the processor is configured to request the UE to apply a first uplink (UL) transmission configuration indicator (TCI) state and a second UL TCI state on PUSCH transmission occasions;
wherein when K>2, the first UL TCI state is applied to a first PUSCH transmission occasion and a second PUSCH transmission occasion, the second UL TCI state is applied to a third PUSCH transmission occasion and a fourth PUSCH transmission occasion, and the same UL TCI mapping pattern continues to remaining PUSCH transmission occasions.

16. The base station of claim 15, wherein the processor is configured to request the UE to apply an indicated transmission configuration on one or more PUSCH repetition transmissions, and/or the PUSCH with one or more repetition transmissions comprise a PUSCH type A repetition and a PUSCH type B repetition.

17. The base station of claim 16, wherein for the PUSCH type A repetition, an indicated transmission configuration is applied on each PUSCH transmission, and/or for the PUSCH type B repetition, the indicated transmission configuration is applied on each nominal repetition or each actual repetition.

18. The base station of claim 16, wherein the UE is scheduled with the PUSCH with one or more repetition transmissions through downlink control information (DCI), and the DCI comprises a DCI format 0_1 or a DCI format 0_2.

19. The base station of claim 18, wherein the DCI indicates a first SRI DCI field and a second SRI DCI field, the first SRI DCI field indicates one or more SRS resources and one SRI-PUSCH-PowerControl parameter, and/or the second SRI DCI field indicates one or more SRS resources and one SRI-PUSCH-PowerControl parameter, and/or a mapping pattern of applying an indicated transmission configuration is performed on each PUSCH transmission occasion, and the mapping pattern is configured by radio resource control (RRC).

20. The base station of claim 15, wherein if the PUSCH repetition is Type B, the UE is indicated with a starting symbol, a length and a number of nominal repetitions (numberofrepetitions), the UE determines a slot location and a symbol location for each of the nominal repetitions; and the UE determines at least one invalid symbol and at least one actual PUSCH repetition;
  wherein when numberofrepetitions=2, the first UL TCI state is applied to a first nominal repetition and the second UL TCI state is applied to a second nominal repetition.

* * * * *